July 28, 1925.
R. C. CONDIT
FLOUR SIFTER
Filed Sept. 6, 1924
1,547,790
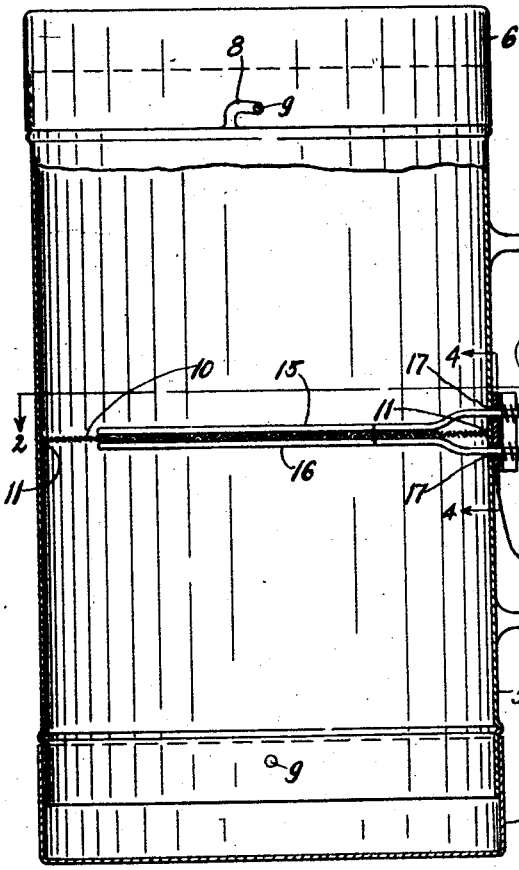
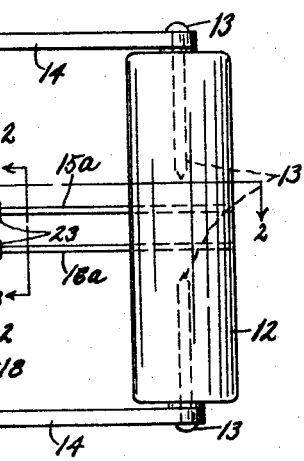
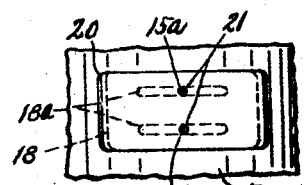
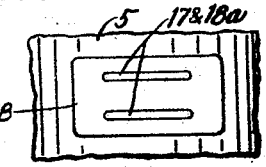
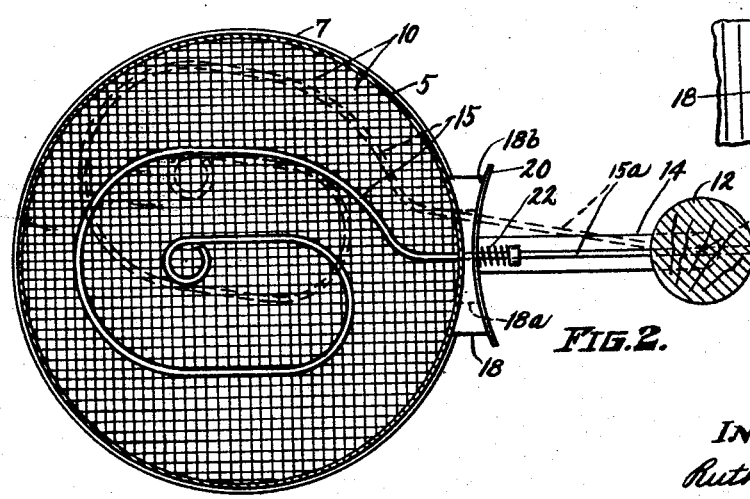
INVENTOR:
Ruth C. Condit.
BY A. M. Carlsen
ATTORNEY.

Patented July 28, 1925.

1,547,790

UNITED STATES PATENT OFFICE.

RUTH C. CONDIT, OF GLENDIVE, MONTANA.

FLOUR SIFTER.

Application filed September 6, 1924. Serial No. 736,370.

*To all whom it may concern:*

Be it known that I, RUTH C. CONDIT, a citizen of the United States, residing at Glendive, in the county of Dawson and State of Montana, have invented certain new and useful Improvements in Flour Sifters, of which the following is a specification.

My invention relates to improvements in reversible flour sifters and the object is to provide a simple and efficient sifter in which the contents may be thoroughly sifted and mixed without removal from the device.

In the accompanying drawing:

Fig. 1 is mainly a vertical sectional elevation of my improved flour sifter, the upper portion of the receptacle, the handle and the agitators being shown in full.

Fig. 2 is a horizontal sectional view as on line 2—2 in Fig. 1.

Fig. 3 is an enlarged sectional detail as on line 3—3 in Fig. 2 and Fig. 4 is also an enlarged sectional detail as on line 4—4 in Fig. 2.

Referring to the drawing by reference numerals 5 designates a cylindrical hopper or receptacle open at both ends and provided with suitable closures 6—7, the latter being preferably made with so-called bayonet slots 8 adapted to engage projecting pins 9 fixed in the receptacle wall.

The receptacle is normally in vertical position and at its center I provide a screen 10 suitably secured to the inner sides by soldering, welding or other means as at 11 in a horizontal plane and dividing the receptacle into an upper and a lower compartment.

12 is a vertical handle rotatably mounted on pins 13 which are rotatable in the outer ends of two vertically spaced, fixed arms 14 projecting from the side of the receptacle.

15—16 are two sifting members preferably made of heavy wire and each of an elongated spiral form (see Fig. 2) and having shanks 15ª—16ª projecting through a pair of horizontal slots 17 in the receptacle, thence both projecting horizontally to and suitably secured in the handle 12 (see Figs. 1 and 2). The sifting members preferably contact with the screen, one on each side thereof.

18 is a lug or embossment secured on the outer side of the receptacle and having two horizontal slots 18ª registering with the slots 17, the shanks 15ª—16ª passing therethrough and movable horizontally therein. The lug 18 has its outer vertical face curved as 18ᵇ (Fig. 2) on a radius from the center of the handle 12 and the slots 18ª are normally covered by a similarly curved sheet metal plate 20 having two properly spaced holes 21 in which the shanks 15ª—16ª are slidably inserted. The plate 20 is spring pressed against the boss 18 by a spring 22 held in compression by a fixed collar 23 on each shank. The plate 20 pressed against the boss 18 thus forms a leak proof construction.

In the use of my device the operator first removes the upper closure, as 6 in Fig. 1, pours the desired amount of flour into the receptacle and then replaces the closure 6. Then the operator grasps the handle 12 and holding it firmly in vertical position moves the hand back and forth horizontally causing the receptacle to swing from side to side about the pivots 13; the sifting members will of course move back and forth on the screen and the flour is sifted through to the lower chamber. The receptacle is inverted after the flour has been sifted through the screen and the sifting process is repeated as often as necessary to break up small particles and reduce the flour to the finest pulverized form, which is highly desirable and necessary for first class baking.

The receptacle being swung in a horizontal plane and about the handle the reason for making the curvature of the boss 18 and plate 20 radial from said handle is obvious. The leak proof construction set forth is one of the main features of the device.

It is obvious also that the horizontal swinging motion of the receptacle is greater than the motion of the agitators or sifting members 15—16 and therefore the latter will move over practically the entire area of the screen and said horizontal movement of the receptacle is only limited by the agitator contacting with the walls of the receptacle.

What I claim is:

1. In a flour sifter, a cylindrical container having means for opening either end of it; two rigid arms projecting radially from one side of the container, a vertically disposed handle pivotally mounted between the outer ends of said arms; a screen mounted transversely within the container, an agitator swingable near by and parallel to the screen, and having a part extending through a slotted portion of the side of the container and secured in said handle, and a leak-proof joint where the agitator extends through the side of the container; said joint comprising a slotted embossment fixed on the container and having a segmental face with the center of the segment in the center of the handle, a plate with corresponding segmental curve slidable on the face of the embossment, and means for holding the plate in engagement with the agitator arm, and means holding the plate in close sliding contact with the segmental face.

2. The structure specified in claim 1, in which the means holding the curved plate with even and constant pressure close to the segmental face, consists of a coil spring encircling the arm of the agitator and a collar on said arm adjusted to bear against the spring.

3. The structure specified in claim 1, in which the agitator consists of two similar members, one arranged at each side of the screen or sieve proper, and having each an arm fixed in the handle, and a spring upon each arm pressing gently the segmental plate against the segmental face, and a collar on each arm adjustable toward the spring thereon.

In testimony whereof I affix my signature.

RUTH C. CONDIT.